United States Patent
de Silva et al.

(10) Patent No.: US 8,332,140 B2
(45) Date of Patent: Dec. 11, 2012

(54) METHOD AND APPARATUS FOR EFFICIENTLY USING A BATTERY IN A SMARTPHONE HAVING A NAVIGATION SYSTEM

(75) Inventors: Andrew S. de Silva, Torrance, CA (US); Linh Doan, Torrance, CA (US); Alex Panganiban, Torrance, CA (US)

(73) Assignee: Alpine Electronics, Inc, Tokyo (JP)

( * ) Notice: Subject to any disclaimer, the term of this patent is extended or adjusted under 35 U.S.C. 154(b) by 233 days.

(21) Appl. No.: 12/751,039

(22) Filed: Mar. 31, 2010

(65) Prior Publication Data
US 2011/0246056 A1    Oct. 6, 2011

(51) Int. Cl.
*G01C 21/00*    (2006.01)
(52) U.S. Cl. ....................................................... 701/412
(58) Field of Classification Search .................. 701/400, 701/410, 412, 422, 423, 424, 425, 541
See application file for complete search history.

(56) References Cited

U.S. PATENT DOCUMENTS

| 7,577,516 | B2 | 8/2009 | Dobeck et al. |
| 2008/0114534 | A1 | 5/2008 | Yamazaki et al. |
| 2010/0069087 | A1* | 3/2010 | Chow et al. ................ 455/456.1 |
| 2010/0238033 | A1* | 9/2010 | Blumel et al. ............ 340/573.4 |

FOREIGN PATENT DOCUMENTS

| JP | 2003232649 | 8/2003 |
| JP | 2004340633 | 12/2004 |
| JP | 2007187620 | 7/2007 |

* cited by examiner

*Primary Examiner* — Kim T Nguyen
(74) *Attorney, Agent, or Firm* — Muramatsu & Associates (57) ABSTRACT

A method and apparatus to optimize energy consumption in a mobile phone having a navigation system is disclosed. The navigation-based method and apparatus efficiently use a smartphone battery to provide the highest possible location accuracy to the driver. When the driver is travelling from a complex route segment to a less complex route segment, current location sensor is switched to another location sensor with lower location accuracy which consumes less battery power. When the driver is travelling from a less complex route segment to a complex route segment, the navigation system continues to use a location sensor with lower accuracy until the navigation system determines that switching to higher accuracy location sensor is necessary to conserve more battery power. The navigation system can determine a best timing to switch according to the driver's familiarity with the route segment or geographical area.

20 Claims, 9 Drawing Sheets

METHOD AND APPARATUS FOR EFFICIENTLY USING A BATTERY IN A SMARTPHONE HAVING A NAVIGATION SYSTEM

FIELD OF THE INVENTION

This invention relates to a method and apparatus to optimize energy consumption in a mobile phone having a navigation system. More specifically, this invention relates to a navigation-based method and apparatus to efficiently use a mobile phone battery to provide the highest possible location accuracy to the driver.

BACKGROUND OF THE INVENTION

During the advance of computer technology, navigation devices have been widely used for over a decade. The navigation device can, not only determine the driver's current position by utilizing the Global Positioning System (GPS), but also provide different routing information between the vehicle's current position and the destination. In order to perform abovementioned functions, the navigation device is usually equipped with a sophisticated navigation system comprising navigation computer programs and one or more detailed database to store and provide maps, road networks, geographical features, and waypoint or point-of-interest (POI) information.

Recently, connected portable devices (portable navigation devices (PNDs), smartphones, etc.) have become more popular and affordable. Most connected portable devices are equipped with location sensors, such as global positioning system (GPS), cellular or Wi-Fi (Wireless Fidelity) triangulation, that provide turn-by-turn navigation guidance to the user. A common problem with these devices is their rapid consumption of the electrical power stored in the battery when the location sensors are operated, which often results in a disrupted user experience when the devices are off due to insufficient battery power.

Figure 1:
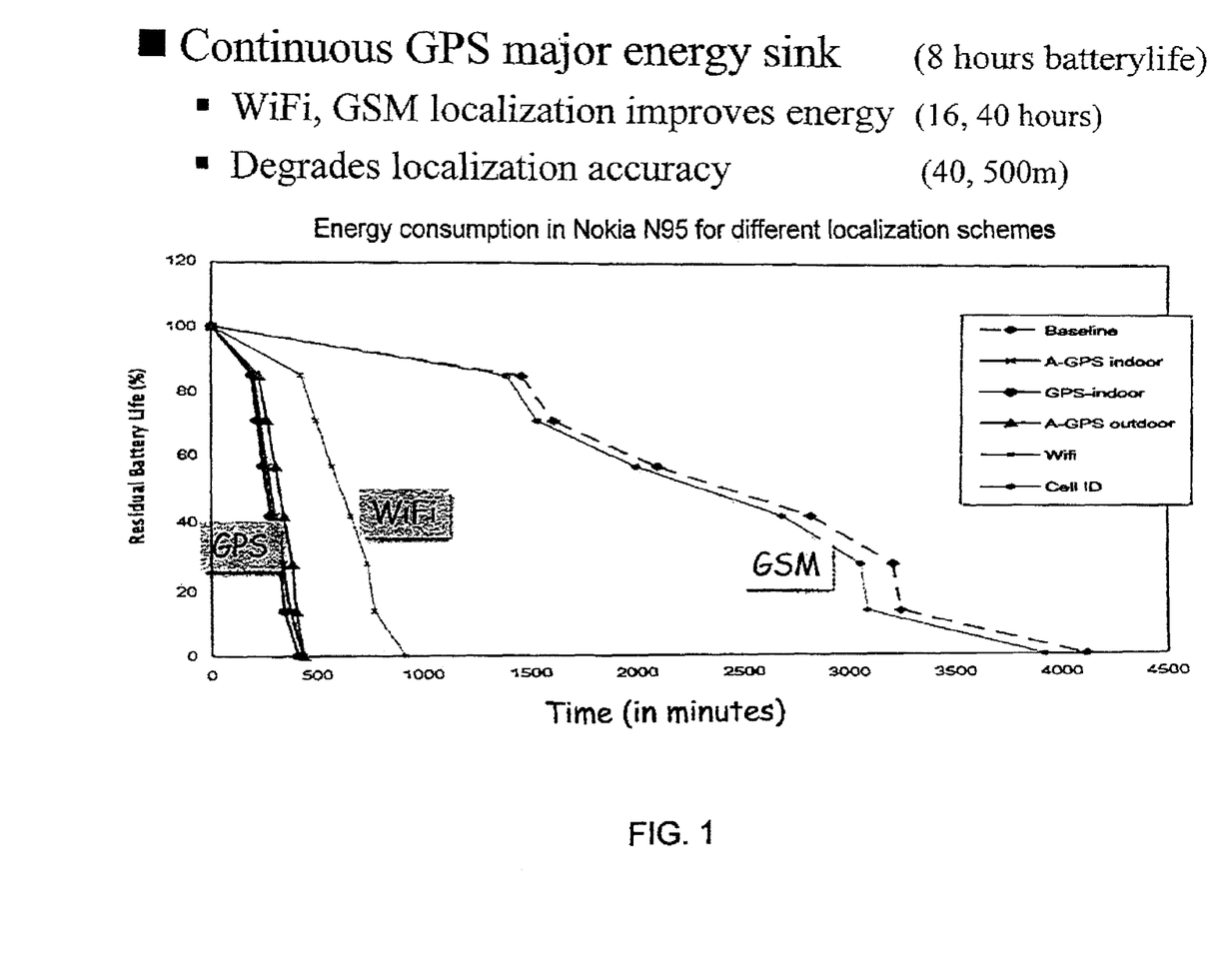
FIG. 1 illustrates the residual battery life versus the operating time among three different location sensors in a smartphone.

Regarding the location accuracy of the abovementioned location sensors, GPS receiver has the highest location accuracy, followed by Wi-Fi and GSM (Global System for Mobile Communication). In terms of power consumption, the same order would be applied to show the power consumption, from the highest to the lowest. As can be seen in FIG. 1 (from Professor Romit Roy Choudhury, Duke University, which is incorporated herein by reference), if the battery life is eight hour when using a GPS receiver, it can be extended to about sixteen hours when using Wi-Fi, and about forty hours when using GSM.

Figure 2:
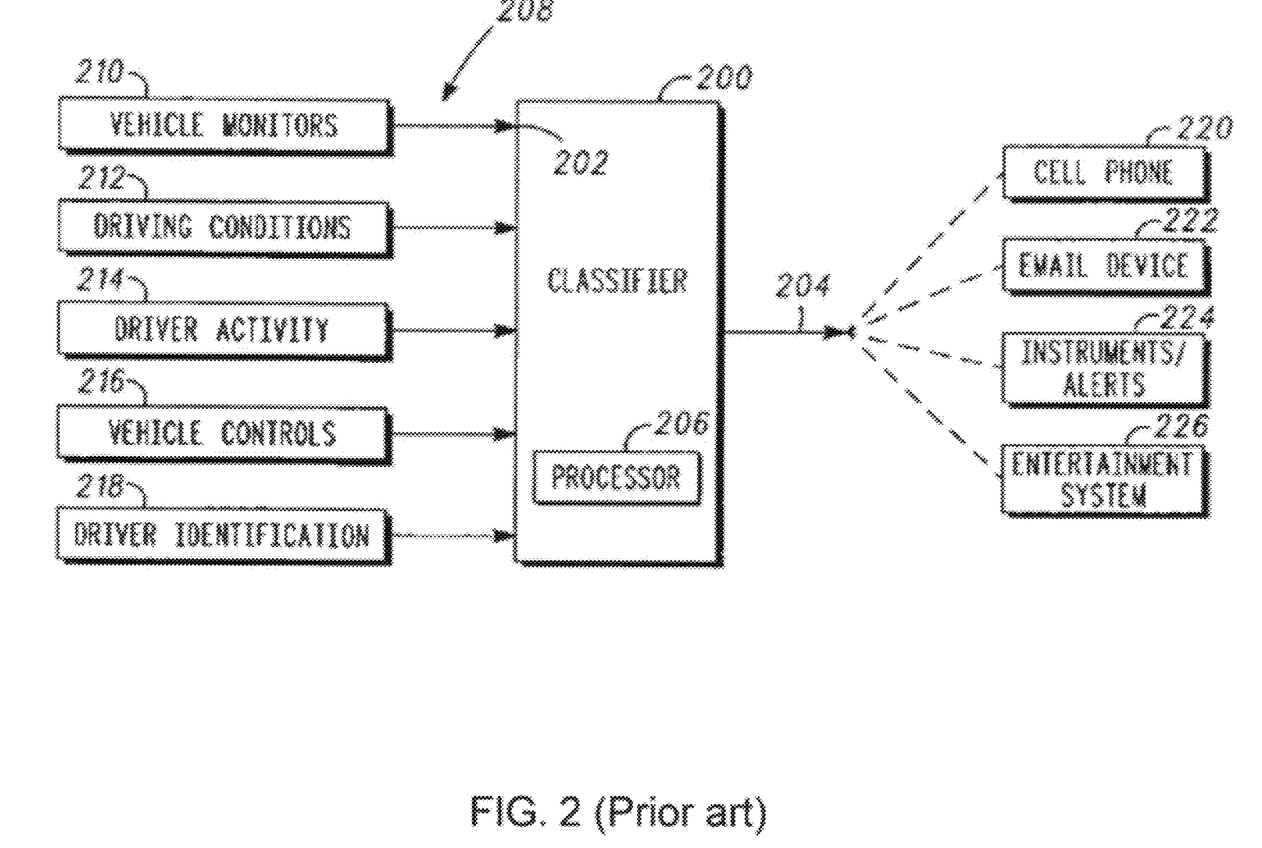
FIG. 2 illustrates a prior art, related to a portable data terminal generally comprising a battery, a central controller, a GPS system, and an auxiliary processor. The central controller has a sleep state by which at least some of the functionalities of the central controller are limited to conserve battery power.

U.S. Pat. No. 7,577,516 to Dobeck et al. discloses a portable data terminal generally comprising a battery, a central controller, a GPS system, and an auxiliary processor. The central controller has a sleep state by which at least some of the functionalities of the central controller are limited to conserve battery power, as shown in FIG. 2. However, Dobeck does not disclose anything related to switching the GPS receiver to other less accurate location sensors such as Wi-Fi or GSM, according to the driver's familiarity of the route or location, or the complexity of the route or location.

Japanese Laid-Open Patent Application No. 2007187620 discloses a method and system to reduce power consumption in a cellular phone with GPS function. More specifically, the GPS will be turned off, and stores a GPS assist signal when arriving at a first reference point. When arriving at a second reference point, the GPS will be again turned on and the stored GPS assist signal will be used for detecting the vehicle's current position. However, like Dobeck, it does not disclose anything related to switching the GPS receiver to other less accurate location sensors such as Wi-Fi or GSM, according to the driver's familiarity of the route or location, or the complexity of the route or location.

Therefore, there remains a need for a new and improved apparatus and method for efficiently using a battery in a mobile phone to provide the highest possible location accuracy to the driver, according to the driver's familiarity of the route or location, or the complexity of the route or location.

SUMMARY OF THE INVENTION

It is an object of the present invention to provide a method and apparatus for optimizing battery usage in a mobile phone to provide the highest possible location accuracy to the driver, by using location matching technologies and realizing the geographic nature of the location where the driver is currently located and/or will be going to.

It is another object of the present invention to provide a method and apparatus for optimizing battery usage in a mobile phone by triggering a location sensor with lower accuracy, according to the driver's predetermined time intervals, such as the driver's calendar which stores his/her activities.

It is a further object of the present invention to provide a method and apparatus for optimizing battery usage in a mobile phone by using the driver's calendar and driving history to determine the driver's familiarity of certain locations, and the lower accuracy location sensor may be triggered if the system determines the driver is familiar with a location.

It is still a further object of the present invention to provide a method and apparatus for optimizing battery usage in a mobile phone in which, when the system determines that the driver may be unfamiliar with the location or route, the system may use the location sensor with the lower accuracy, namely consuming less power, as long as possible to conserve more battery power, then switch to the location sensor with higher accuracy.

This invention relates to a method and apparatus to optimize energy consumption in a mobile phone while operating a navigation system. More specifically, this invention relates to a navigation-based method and apparatus to efficiently use a mobile phone battery to provide the highest possible location accuracy to the driver. In one aspect, the mobile phone may include a memory device; a transceiver; a battery, a control unit; and a navigation system having more than one location sensor with different accuracies, where the control unit is adapted to switch one location sensor to another when a predetermined condition occurs to more efficiently use the battery in the mobile phone.

In one embodiment, the location sensor may include a GPS receiver (GPS sensor), Wi-Fi, or GSM sensor. As noted above, the GPS receiver has the highest location accuracy, followed by Wi-Fi and GSM. Meanwhile, the GPS receiver may consume more battery power than Wi-Fi or GSM. In an exemplary embodiment, the control unit may switch one location sensor to another with lower location accuracy to save the battery power when the control unit determines that the geographic nature of the destination or the route the driver will be taking is not complex.

On the other hand, in another embodiment, when the control unit determines that the geographic nature of the destination or the route the driver will be taking is complex, the control unit is configured to use the location sensor with lower accuracy as long as possible before switching to the high accuracy one.

According to another aspect in the present invention, a method for more efficiently using a battery in the mobile phone while operating a navigation system may include the steps of generating a route according to an address or a location entered by a driver; dividing the route into more than one route segment; determining route complexity in, each route segment; and automatically switching one location sensor in the navigation system to another location sensor therein to maximize the power saving in the usage of the smartphone battery.

In one embodiment, when the driver is travelling from a complex route segment to a less complex route segment, the location sensor is switched to another location sensor with lower location accuracy which consumes less battery power. In another embodiment, when the driver is travelling from a less complex route segment to a complex route segment, the navigation system continues to use a location sensor with lower accuracy until the navigation system determines that switching to higher accuracy location sensor is absolutely necessary, to conserve more battery power.

In a further embodiment, the step of automatically switching one location sensor to another location sensor when the route complexity changes includes the step of determining a best timing to switch the location sensor with lower location accuracy to another location sensor with higher location accuracy. In still a further embodiment, the step of determining a best timing to switch the location sensor with lower location accuracy to another location sensor with higher location accuracy includes the step of receiving information including prior completion time to the destination and any anticipatory delay; historical and predictive traffic conditions; distance between the current position and destination; and population density of the current vehicle position, destination and all areas in between.

In an exemplary embodiment, the method for more efficiently using a battery in a smartphone while operating a navigation system may further include the step of determining the driver's familiarity of the route or the geographical nature of the address or location. In a different embodiment, the step of determining the driver's familiarity of the route or the geographical nature may include the step of checking the driver's historical activities stored in the memory device.

According to another aspect of the present invention, a smartphone device may include a database, a memory device, a wireless protocol, a transceiver, an antenna and a plurality of phone applications. To enable the user to place and receive phone calls in a conventional manner, the smartphone may also include a user interface, a control unit, a keypad, a display, a microphone, a speaker and a battery. For example, the user may place a call by entering a phone number using the keypad. The user interface is adapted to communicate the user's action to the control unit, along with displaying information to the user via the display. The control unit is configured to place the call using the transceiver and the antenna. The user may engage in the phone conversation in a conventional way using the microphone and the speaker. The wireless protocol conforms to the wireless communication standard and provides the smartphone data communication capabilities. The phone application may include a navigation system having more than one location sensor with different accuracies, and the control unit is adapted to switch one location sensor to another when a predetermined condition occurs to more efficiently use the battery in the smartphone device.

In one embodiment, the navigation system may be equipped with a position/distance measuring device which may include a GPS receiver, a Wi-Fi positioning system (WPS) and a GSM sensor, wherein the GPS receiver has the highest location accuracy, followed by the WPS and GSM sensor. On the other hand, the GPS receiver may consume more battery power than the WPS and GSM.

In another embodiment, the navigation system may include a route generating unit to retrieve map and road network data from a database and generate a calculated route. The route generating unit may include a route dividing unit to divide the calculated route into more than one route segment and a route complexity determining unit. As mentioned above, a current location sensor may be switched to another one in the navigation (either with higher or lower location accuracy) when the route complexity changes. In another embodiment, the route complexity determining unit may be operatively communicated with the route dividing unit to properly assign information on the route complexity to each route segment. In a different embodiment, the complexity can be encoded into the map database in the navigation system.

In a further embodiment, the route complexity determining unit can retrieve the driver's historical activities from the memory device to determine the driver's familiarity with respect to the route segments.

The present invention together with the above and other advantages may best be understood from the following detailed description of the embodiments of the invention illustrated in the drawings below.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a method and apparatus to optimize energy consumption in a mobile phone while operating a navigation system therein. More specifically, this invention relates to a navigation-based method and apparatus to efficiently use a mobile phone battery to provide the highest possible location accuracy to the driver. As stated above, a common problem with these mobile phone devices is their rapid consumption of the electrical power stored in the battery when the location sensors are operated. Since the location sensor with higher accuracy consumes more energy, this invention switches the high accuracy sensor (e.g. GPS receiver) to some lower accuracy sensors (e.g. Wi-Fi, GSM) to save battery power, under certain circumstances.

Figure 3:
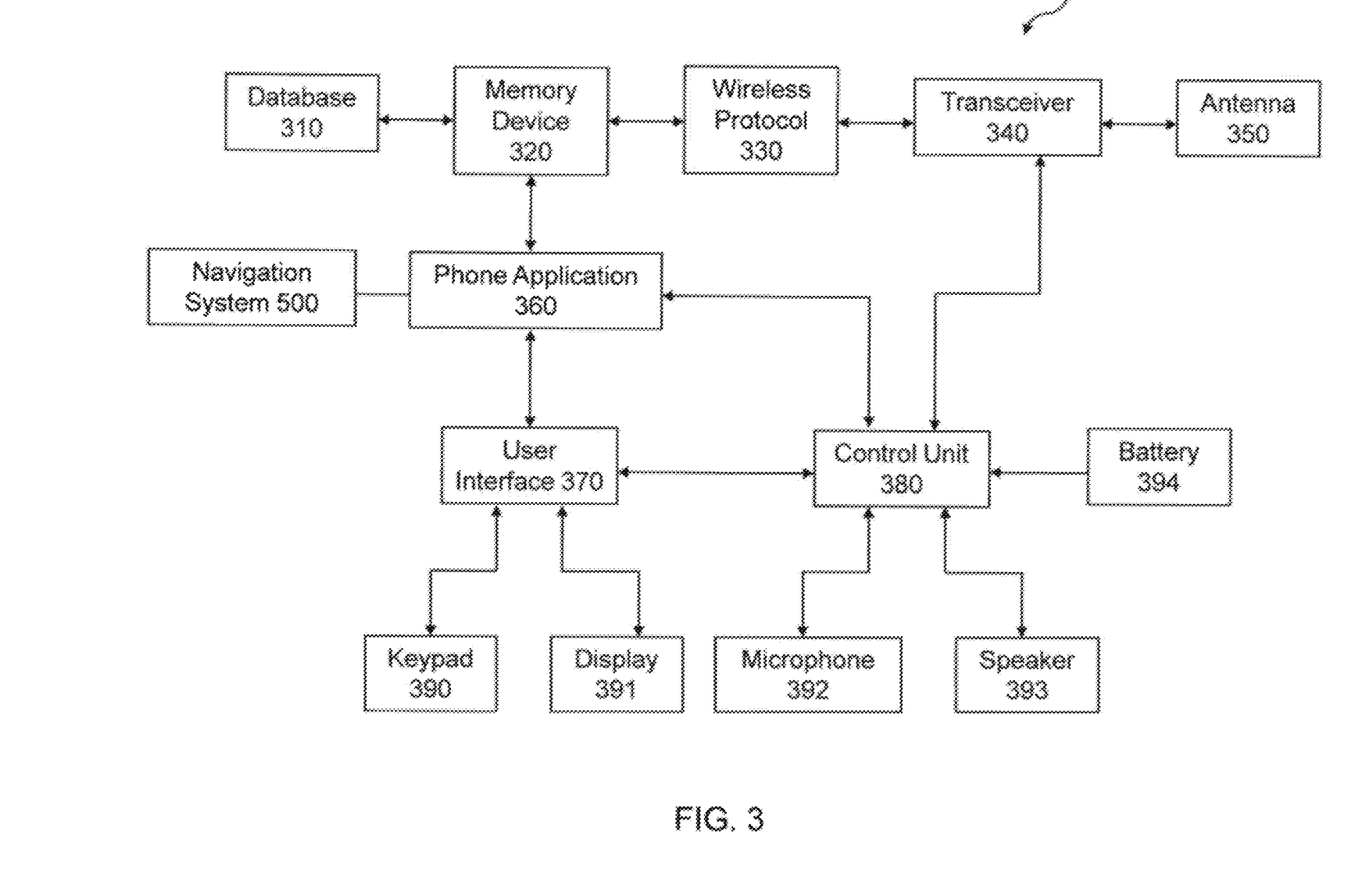
FIG. 3 illustrates a functional block diagram showing an example of structure of a smartphone implementing the method and apparatus for efficiently using a battery in a smartphone while operating a navigation system.

Referring to FIG. 3, a smartphone device 300 may include a database 310, a memory device 320, a wireless protocol 330, a transceiver 340, an antenna 350, and a plurality of phone applications 360. To enable the user to place and receive phone calls in a conventional manner, the smartphone 300 may also include a user interface 370, a control unit 380, a keypad 390, a display 391, a microphone 392, a speaker 393 and a battery 394. For example, the user may place a call by entering a phone number using the keypad 390. The user interface 370 is adapted to communicate the user's action to the control unit 380, along with displaying information to the user via the display 391. The control unit 380 is configured to place the call using the transceiver 340 and the antenna 350. The user may engage in the phone conversation in a conventional way using the microphone 392 and the speaker 393. The wireless protocol 330 conforms to the wireless communication standard and provides the smartphone 300 data communication capabilities. The phone application 360 may include a navigation system 500 having more than one location sensor with different accuracies, and the control unit 380 is adapted to switch one location sensor to another when a predetermined condition occurs to more efficiently use the battery in the smartphone device 300.

Figure 5:
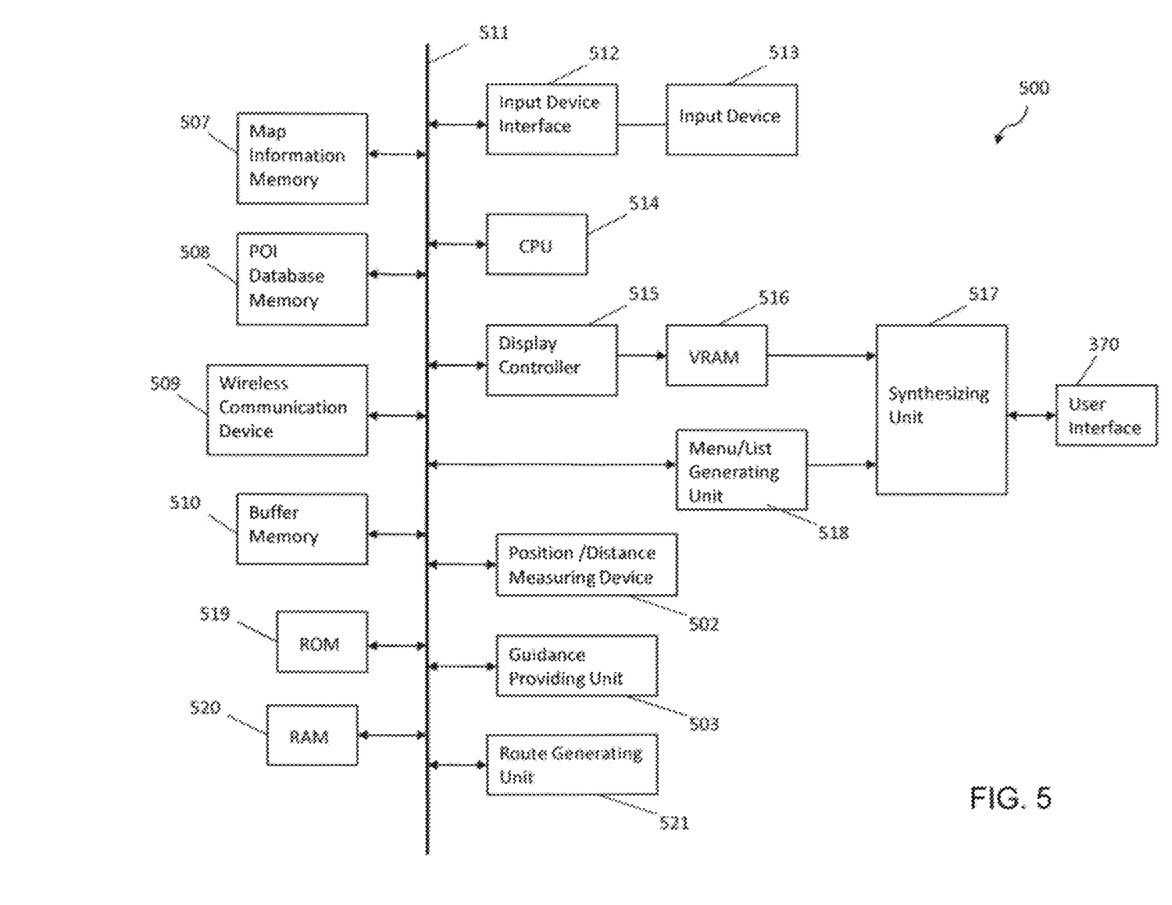
FIG. 5 illustrates a functional block diagram showing an example of structure of a navigation system implementing the method and apparatus for efficiently using a battery in a smartphone.
Figure 5A:
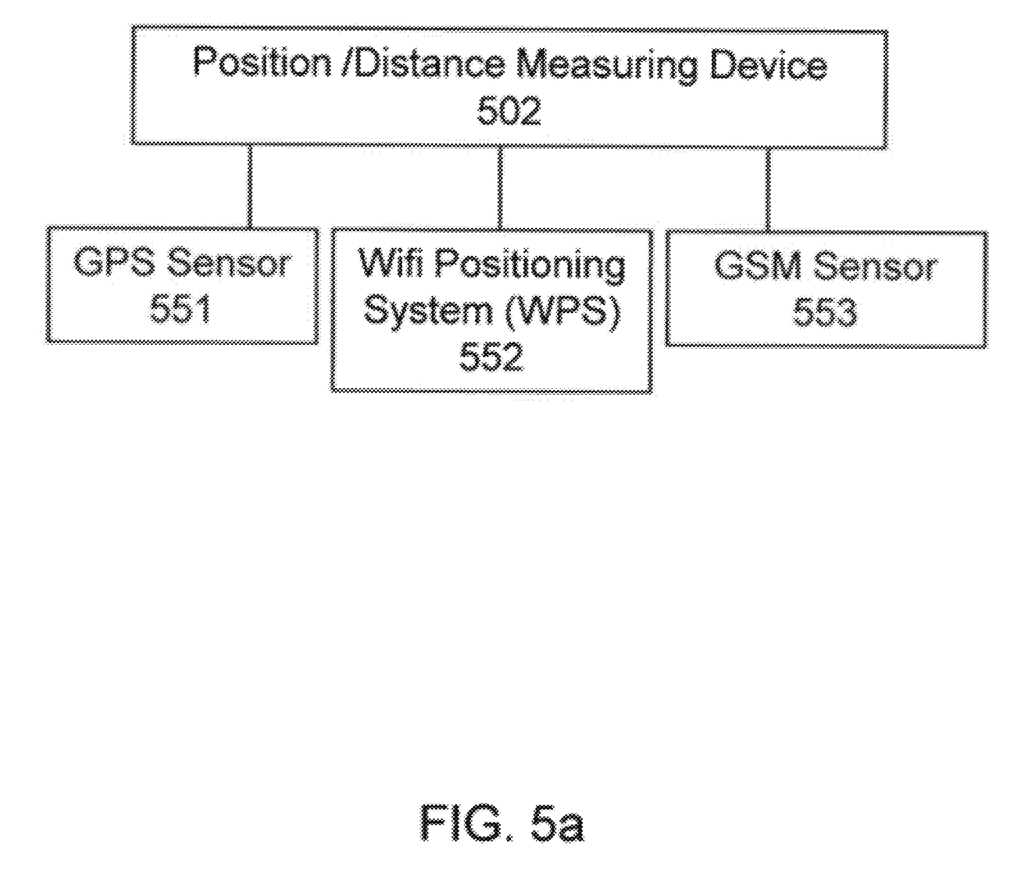
FIGS. 5a and 5b illustrate two embodiments of FIG. 5.

In one embodiment shown in FIG. 5a, the navigation system 500 may be equipped with a position/distance measuring device 502 which may include a GPS receiver (GPS sensor) 551, a Wi-Fi positioning system (WPS) 552 and a GSM sensor 553. The GPS receiver 551 has the highest location accuracy, followed by the WPS 552 and GSM sensor 553. On the other hand, the GPS receiver 551 may consume more battery power than the WPS 552 and GSM 553.

Figure 5B:
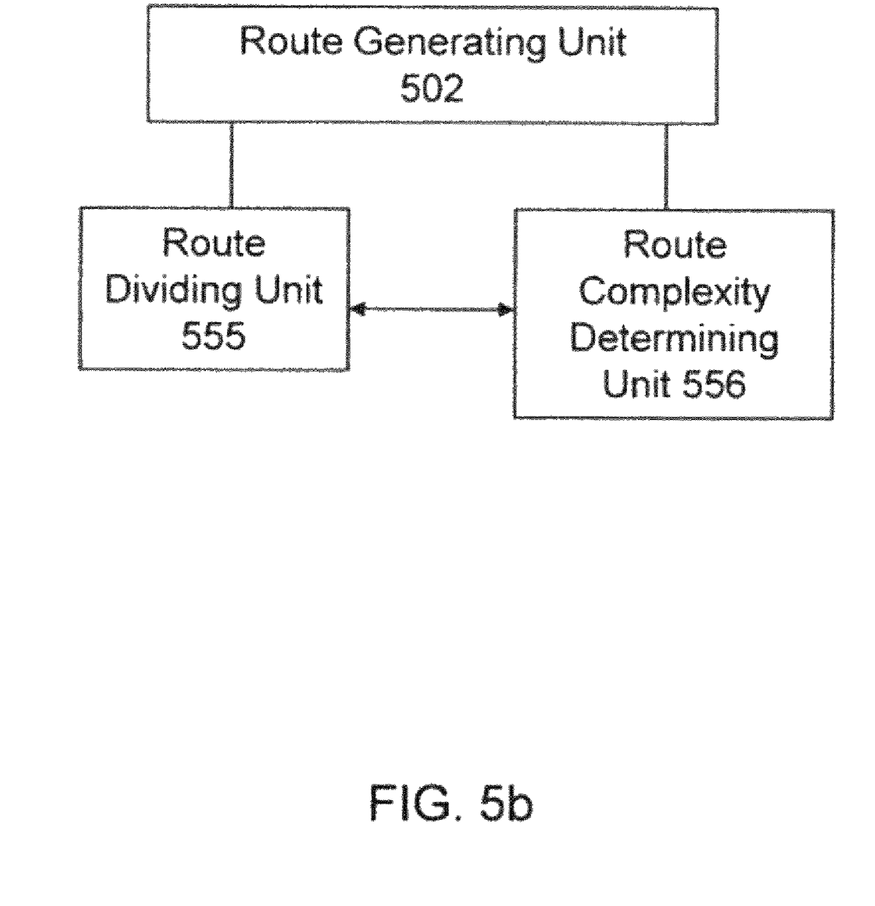

The navigation system 500 may include a route generating unit 521 to retrieve map and road network data from a database 310 and generate a calculated route. As shown in FIG. 5b, the route generating unit 521 may include a route dividing unit 555 to divide the calculated route into more than one route segment and a route complexity determining unit 556. As mentioned above, a current location sensor may be switched to another one in the navigation system 500 (either with higher or lower location accuracy) when the route complexity changes. In another embodiment, the route complexity determining unit 556 may be operatively communicated with the route dividing unit 555 to properly assign information on the route complexity to each route segment. In a different embodiment, the complexity can be encoded into the map database in the navigation system 500.

In a further embodiment, the route complexity determining unit 556 can retrieve the driver's historical activities from the memory device 320 to determine the driver's familiarity with respect to the route segments. For example, when the route complexity determining unit 556 may consider that the driver is familiar in a route segment if he/she drives on that route segment several times a week. On the other hand, if the driver only drives on that route segment several times a year, an opposite result may be generated. The determining unit 556 may also consider the time length of the historical activities. For example, the determining unit 556 may consider that the driver is unfamiliar with the route segment even if the driver used to drive on the same route segment for three years, but have not done so for five years.

Figure 4:
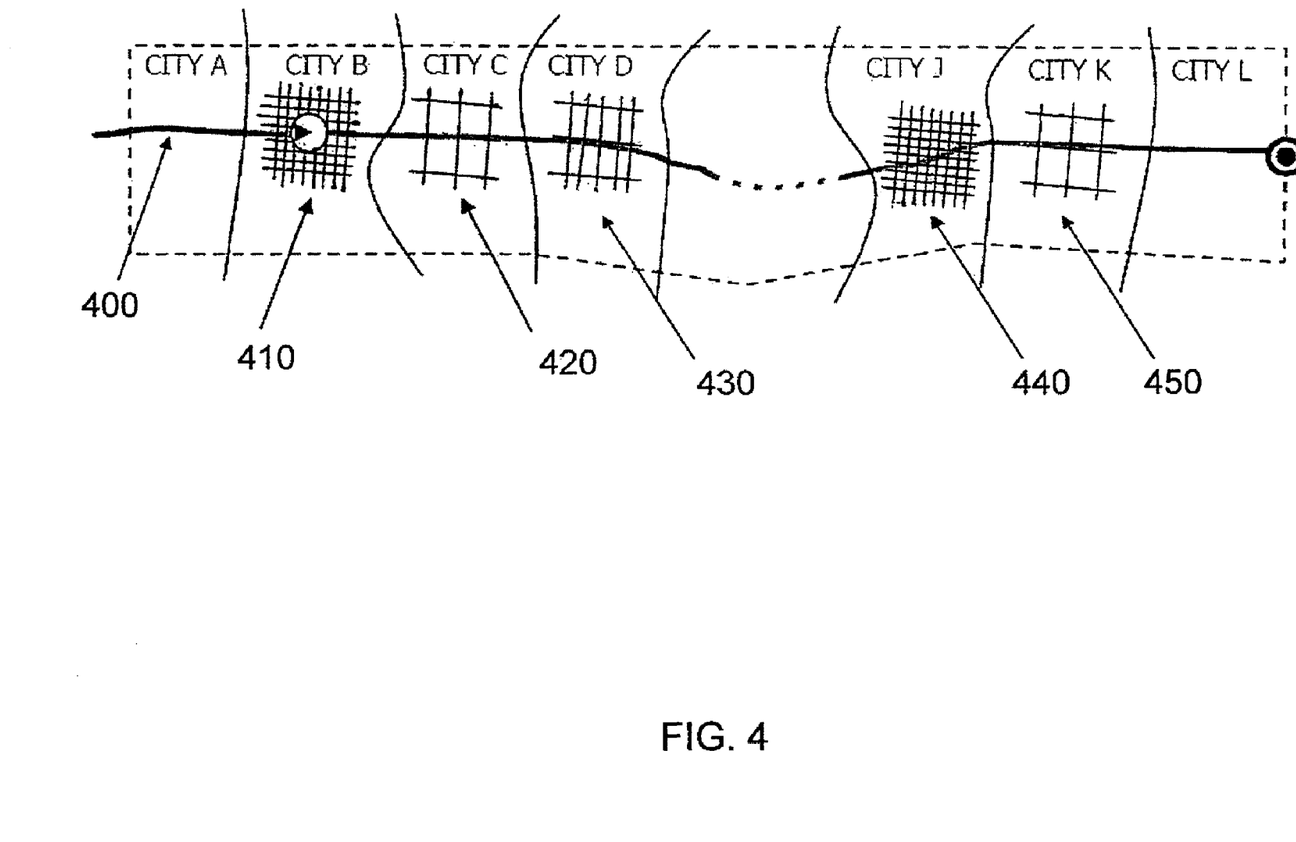
FIGS. 4, 4a and 4b depict an example to illustrate the complexity of route segments and geographical nature of an area.

In still a further embodiment shown in FIG. 4, the route 400 is divided into two or more route segments (410 to 450) according to the cities the driver may drive by. Here, the route complexity may be defined based on the population, traffic, road networks . . . etc. in the city. For example, the route complexity may be higher in the route segments 410 and 440 (Cities B and J) due to dense street grids, while the route complexity may be lower in the route segments 420, 430 and 450 (Cities C, D and K). When the driver is driving from a complex route segment such as 410 to a less complex route segment 420, the current location sensor is switched to another location sensor with lower location accuracy which consumes less battery power. If the driver is traveling to a route segment with similar route complexity, the location sensor may not be switched. Similarly, if the driver is travelling from a geographic area 460 (shown FIG. 4a) to a less complex geographic area 470 (shown in FIG. 4b), the current location sensor can be switched to another location sensor with lower location accuracy which consumes less battery power.

Figure 4A:
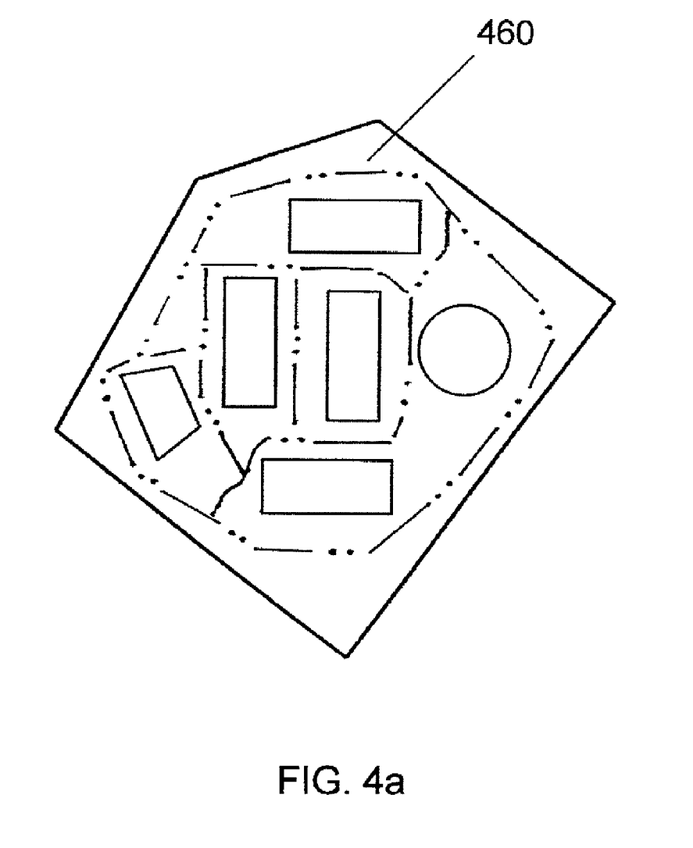
Figure 4B:
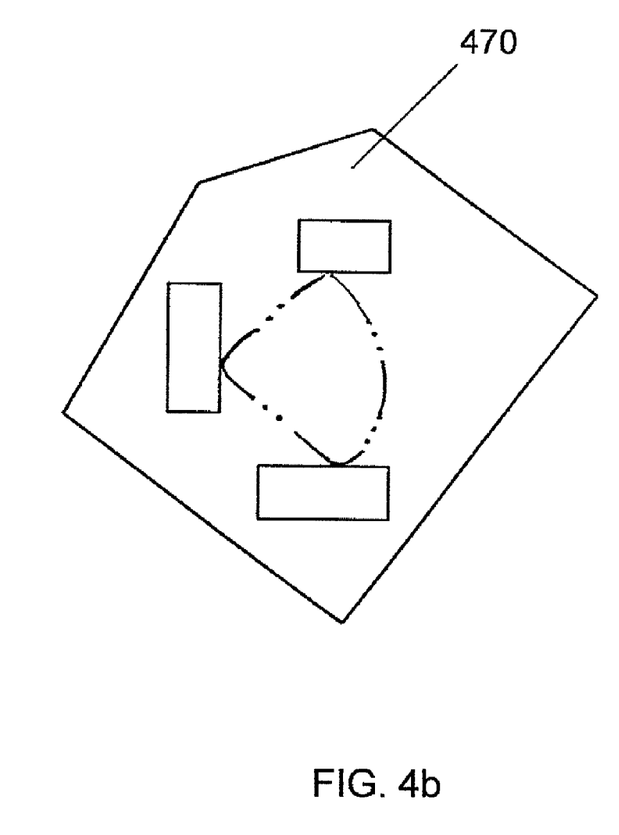

On the other hand, if the driver is driving from a less complex route segment 420 (City C) to a more complex route segment 430 (City D), or a less complex geographic area 470 to a more complex geographic area 460, the current location sensor can be switched to another location sensor with higher location accuracy, at a best timing to conserve as much battery power as possible. It is known that the location sensor with higher location accuracy consumes more battery power than that with lower location accuracy. In order to conserve more battery power, the location sensor switching process may not start as soon as the route complexity changes from low to high. More particularly, the navigation system 500 may continue to use the location sensor with lower accuracy until the navigation system 500 determines that switching to higher accuracy location sensor is absolutely necessary.

Furthermore, the most accurate location sensor such as the GPS receiver (GPS sensor) 551 may be necessary for initial route calculation before the navigation system 500 can determine when to switch to a higher accuracy location sensor. The navigation system 500 may consider the following factors to determine the best timing to switch from low accuracy to higher accuracy location sensor to conserve more battery power: (1) prior completion time to the destination and any anticipatory delay; (2) historical and predictive traffic conditions; (3) distance between the current position and destination; and (4) population density of the current vehicle position, destination and all areas in between.

In an exemplary embodiment, the control unit 380 may be adapted to calculate a best timing to switch the location sensor from low accuracy to higher accuracy by considering the abovementioned factors. For example, if there is an activity in the driver's calendar at 2 pm, an estimated time of arrival (ETA) to the activity is thirty minutes, and an operation time for the navigation system 500 is about ten minutes, the best timing to switch to the more accurate location sensor may take place at 1:20 pm to give the navigation system 500 a sufficient time to analyze and predict the route conditions from the user's location to the next activity and deliver the best route to the user. The navigation system 500 may continue to use the high precision sensor until the user reaches a familiar location or route, upon which the navigation system 500 can determine whether to switch to a lesser power consuming/less accuracy sensor or keep using the more precise high power consumption sensor, according to the user's familiarity of the location or route. In other words, the user's familiarity of the location or route is highly related to the complexity of the route or location which may be determined by the navigation system 500.

In a different embodiment, the control unit 380 may be configured to measure the power level of the battery 394 and communicate such information with the navigation system 500, such that the navigation system 500 can efficiently use the battery power while providing the highest possible location accuracy to the driver. For example, when the navigation system 500 realizes that the battery level is only sufficient for five minutes using the high accuracy location sensor, e.g. GPS receiver 551, and an estimated time of arrival to the destination is twenty minutes, the navigation system 500 may immediately switch to the low accuracy location sensor and direct the driver to the less complex route segments by considering the abovementioned four factors. In another embodiment, the navigation system 500 may direct the driver to the familiar route segments before the power goes off.

FIG. 5 is a block diagram showing an example of detailed structure of the navigation system 500 for implementing the present invention. The navigation system 500 includes a user interface 370 and a position and distance measuring device 502 for measuring the present vehicle position or user position. For example, the position and distance measuring device 502 has a speed sensor for detecting a moving distance, a gyroscope for detecting a moving direction, a microprocessor for calculating a position, a GPS (global positioning system) sensor for detecting the vehicle's current position by receiving radio waves generated by a GPS satellites. In one embodiment, the GPS receiver (GPS sensor) 551 in FIG. 5a is, for example, used as the current position detection portion, but the speed sensor, a steering sensor, an altimeter or the like can be used individually or in combination instead of the GPS receiver 551. In other embodiments, the position and distance measuring device 502 may also include the Wi-Fi positioning system (WPS) 552 and the GSM sensor 553, as shown in FIG. 5a.

As shown in FIG. 5, the navigation system 500 may also include a guidance providing unit 503 to provide guidance information to the driver on a turn-by-turn basis; a map information memory 507 for storing the map information; a route generating unit 521 adapted to retrieve the map and road network data from the database and generate a calculated route; and a database memory 508 for storing database information such as point of interest (POI) information. In one embodiment shown in FIG. 5b, the route generating unit 521 may include a route dividing unit 555 to divide the calculated route into more than one route segment and a route complexity determining unit 556.

Still referring to FIG. 5, the navigation system 500 further includes an input device 513 for executing a menu selection operation, an enlarge/reduce operation, a destination input operation, etc. and an input device interface 512. In one embodiment, the input device 513 can be the keypad 390 in the smartphone device 300. The navigation system 500 also includes a bus 411 for interfacing the above units in the system, a processor (CPU) 514 for controlling an overall operation of the navigation system 500, a ROM 519 for storing various control programs such as a route search program and a map matching program necessary for navigation control, a RAM 520 for storing a processing result such as a guide route, a display controller 515 for generating a map image (a map guide image and an arrow guide image) on the basis of the map information, a VRAM 516 for storing images generated by the display controller 515, a menu/list generating unit 518 for generating menu image/various list images, a synthesizing unit 517, a wireless communication device 509 to retrieve data from a remote server, the Internet or other communication networks, and a buffer memory 510 for temporary storing data for ease of data processing.

In one embodiment, the CPU 514 may be integrated in the control unit 380. Also, the memory device 320 may include the ROM 519 and RAM 520 in the navigation system 500. The wireless communication device 509 may be operated with the wireless protocol 330 in the smartphone device 300.

Figure 6:
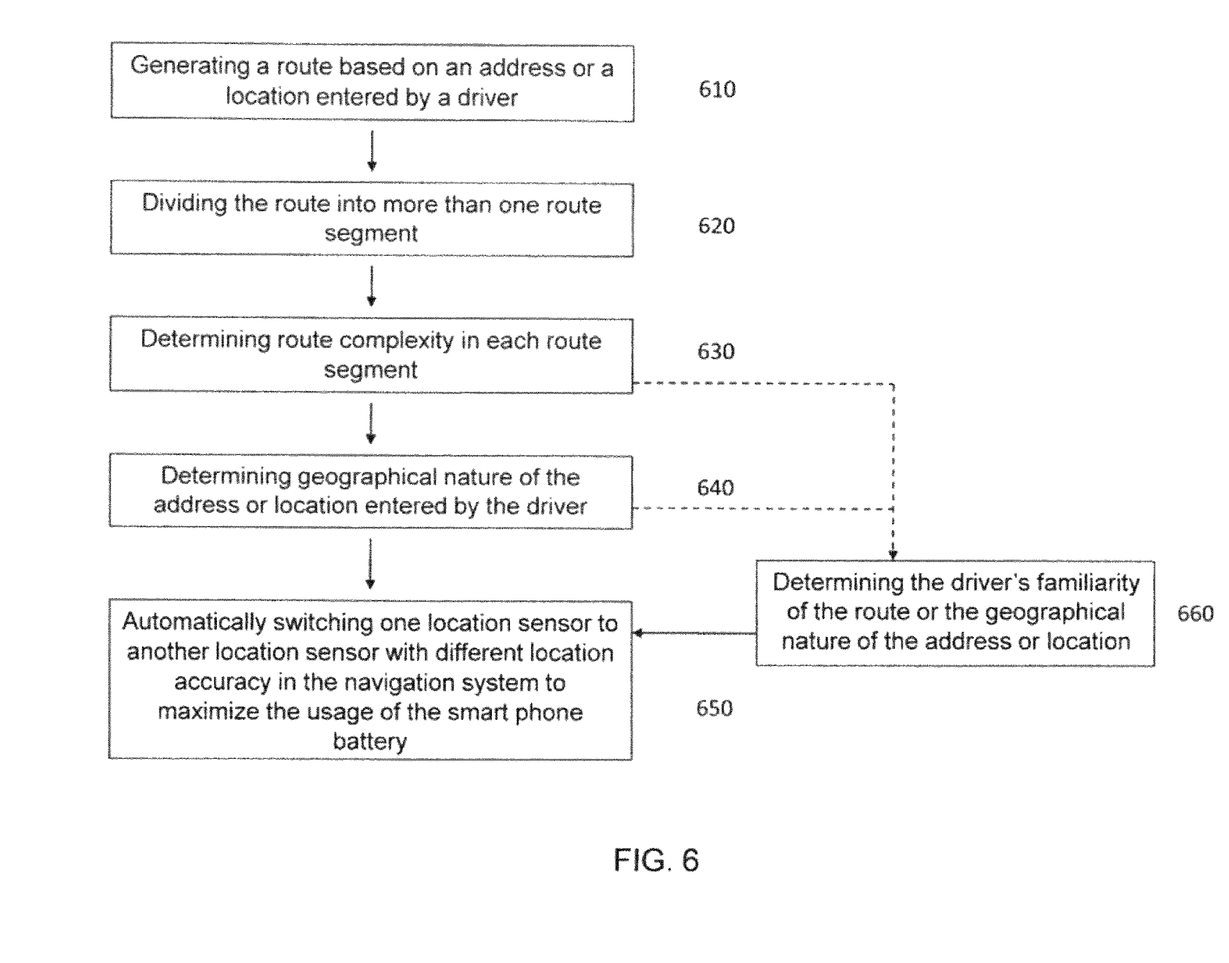
FIG. 6 illustrates another aspect of the present invention, depicting a method for efficiently using a battery in a smartphone while operating a navigation system.

A program for efficiently using a battery in a smartphone with a navigation system in the present invention shown in the flow chart of FIG. 6 is stored in the ROM 519 or other memory and is executed by the CPU 514. The CPU 514 controls an overall operation of the guidance display method and apparatus in the present invention.

According to another aspect of the present invention, a method for more efficiently using a battery in a smartphone while operating a navigation system therein may include the steps of generating a route based on an address or a location entered by a driver 610; dividing the route into two or more route segments 620; determining route complexity in each route segment 630; determining geographical nature of the address or location entered by the driver 640; and automatically switching one location sensor to another location sensor with different location accuracy in the navigation system to maximize the power saving in the usage of the smartphone battery 650.

In one embodiment, as mentioned above, when the driver is travelling from a complex route segment to a less complex route segment, the location sensor is switched to another location sensor with lower location accuracy which consumes less battery power. In another embodiment, when the driver is travelling from a less complex route segment to a complex route segment, the navigation system 500 continues to use a location sensor with lower accuracy until the navigation system 500 determines that switching to higher accuracy location sensor is absolutely necessary, to conserve more battery power.

In a further embodiment, the step of automatically switching one location sensor to another location sensor when the route complexity changes 650 includes the step of determining a best timing to switch the location sensor with lower location accuracy to another location sensor with higher location accuracy. In still a further embodiment, the step of determining a best timing to switch the location sensor with lower location accuracy to another location sensor with higher location accuracy includes the step of receiving information including prior completion time to the destination and any anticipatory delay; historical and predictive traffic conditions; distance between the current position and destination; and population density of the current vehicle position, destination and all areas in between.

In an exemplary embodiment, the method for more efficiently using a battery in a smartphone while operating a navigation system therein may further include the step of determining the driver's familiarity of the route or the geographical nature of the address or location 660. In a different embodiment, the step of determining the driver's familiarity of the route or the geographical nature 660 may include the step of checking the driver's historical activities stored in the memory device 310.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A method for efficiently using a battery in a mobile device while operating a navigation system therein, the method comprising:
    generating a route based on an address or a location entered by a driver;
    dividing the route into more than one route segment;
    determining route complexity in each route segment;
    determining geographical nature of the address or location entered by the driver; and
    automatically switching a current location sensor to another location sensor in the navigation system when the route complexity or geographical nature changes such that a location sensor with lower accuracy is used in a substantially low complexity route segment and a location sensor with higher accuracy is used in a substantially high complexity route segment, in order to maximize the usage of the battery in the mobile device.

2. The method of claim 1, wherein when the driver is travelling from a less complex route segment to a complex route segment, the navigation system continues to use the location sensor with lower accuracy until the navigation system determines that switching to higher accuracy location sensor is necessary.

3. The method of claim 2, wherein the step of automatically switching a current location sensor to another location sensor when the route complexity changes includes a step of determining a best timing to switch the location sensor with lower location accuracy to another location sensor with higher location accuracy.

4. The method of claim 3, wherein the step of determining a best timing to switch the location sensor with lower location accuracy to another location sensor with higher location accuracy includes a step of receiving information including prior completion time to a destination and any anticipatory delay; historical and predictive traffic conditions; distance between the current position and destination; and population density of a current position, destination and all areas in between.

5. The method of claim 1, further comprising a step of determining driver's familiarity of the route or the geographical nature of the address or location.

6. The method of claim 5, wherein the step determining the driver's familiarity of the route or the geographical nature includes a step of checking driver's historical activities stored in a memory device.

7. The method of claim 1, wherein the mobile device is a smartphone.

8. An apparatus for efficiently using a battery in a mobile device while operating a navigation system therein comprising:
    a controller for controlling an overall operation of the mobile device;
    a plurality of location sensors provided in the navigation system;
    wherein the navigation system is configured to conduct the following operations of:
        generating a route based on an address or a location entered by a driver;
        dividing the route into more than one route segment;
        determining route complexity in each route segment;
        determining geographical nature of the address or location entered by the driver; and
    wherein the controller is configured to conduct an operation of automatically switching a current location sensor to another location sensor in the navigation system when the route complexity or geographical nature changes such that a location sensor with lower accuracy is used in a substantially low complexity route segment and a location sensor with higher accuracy is used in a substantially high complexity route segment, in order to maximize the usage of the battery in the mobile device.

9. The apparatus of claim 8, wherein when the driver is travelling from a less complex route segment to a complex route segment, the navigation system continues to use the location sensor with lower accuracy until the controller determines that switching to higher accuracy location sensor is necessary.

10. The apparatus of claim 9, wherein, when automatically switching a current location sensor to another location sensor when the route complexity changes, the controller causes an operation of determining a best timing to switch the location sensor with lower location accuracy to another location sensor with higher location accuracy.

11. The apparatus of claim 10, wherein, when determining a best timing to switch the location sensor with lower location accuracy to another location sensor with higher location accuracy, the controller causes an operation of receiving information including prior completion time to a destination and any anticipatory delay; historical and predictive traffic conditions; distance between a current position and destination; and population density of the current position, destination and all areas in between.

12. The apparatus of claim 8, the controller further causes an operation of determining driver's familiarity of the route or the geographical nature of the address or location.

13. The apparatus of claim 12, wherein, when determining the driver's familiarity of the route or the geographical nature, the controller causes an operation of checking driver's historical activities stored in a memory device.

14. The apparatus of claim 8, wherein the mobile device is a smartphone.

15. A mobile device comprising:
    a memory device;
    a controller; and
    a navigation system comprising:
    a plurality of location sensors with different location accuracies;
    a route generator configured to generate a route based on an address or a location entered by a driver;
    a route divider configured to divide said route into different route segments;

a route complexity determining module configured to determine complexity of each route segment;

wherein the controller is configured to switch a current location sensor to another location sensor in the navigation system when the route complexity or geographical nature changes such that a location sensor with lower accuracy is used in a substantially low complexity route segment and a location sensor with higher accuracy is used in a substantially high complexity route segment, in order to maximize the usage of the battery in the mobile device.

16. The mobile device of claim 15, wherein when the driver is travelling from a less complex route segment to a complex route segment, the navigation system continues to use the location sensor with lower accuracy until the controller determines that switching to higher accuracy location sensor is necessary to conserve more battery power.

17. The mobile device of claim 16, wherein the controller causes an operation of determining a best timing to switch the location sensor with lower location accuracy to another location sensor with higher location accuracy.

18. The mobile device of claim 15, wherein the controller further causes an operation of determining driver's familiarity of the route or the geographical nature of the address or location.

19. The mobile device of claim 18, wherein, when determining the driver's familiarity of the route or the geographical nature, the controller causes an operation of checking driver's historical activities stored in said memory device.

20. The mobile device of claim 15, wherein the mobile device is a smartphone.

* * * * *